Figure 1:
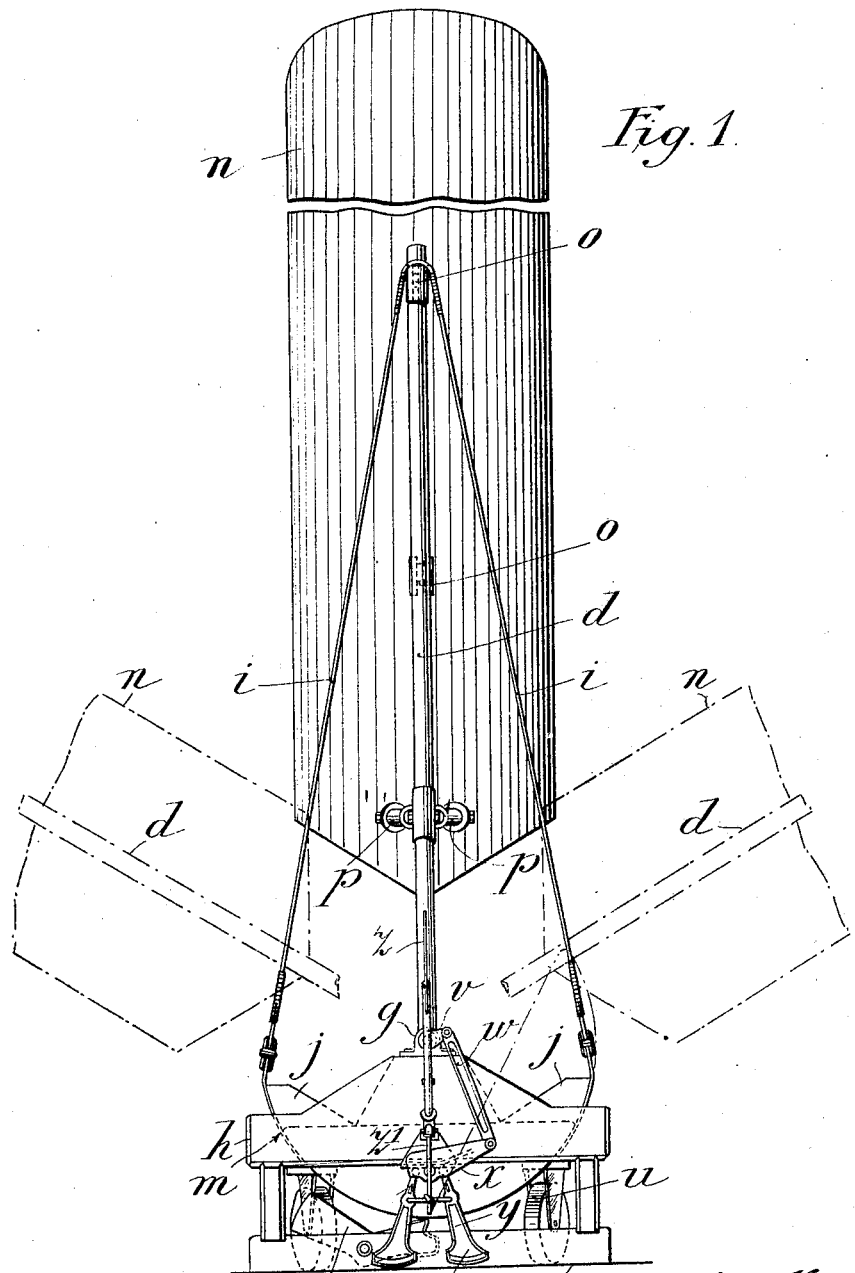

April 15, 1924.  1,490,787

J. I. THORNYCROFT

WIND MOTOR

Filed March 20, 1922    2 Sheets-Sheet 1

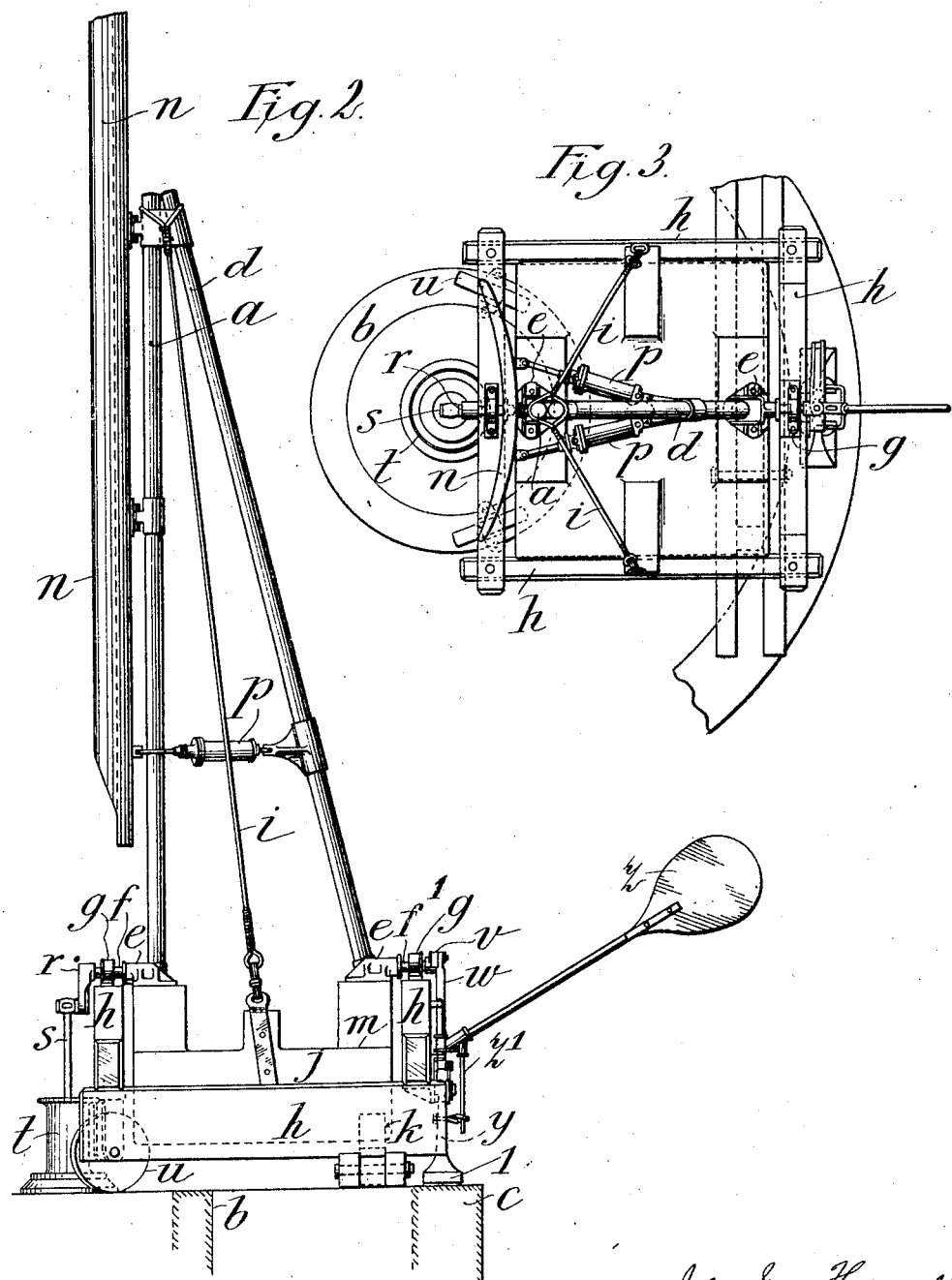

Patented Apr. 15, 1924.

1,490,787

UNITED STATES PATENT OFFICE.

JOHN ISAAC THORNYCROFT, OF BEMBRIDGE, ISLE OF WIGHT, ENGLAND.

WIND MOTOR.

Application filed March 20, 1922. Serial No. 545,090.

*To all whom it may concern:*

Be it known that I, JOHN ISAAC THORNYCROFT, a subject of the King of Great Britain and Ireland, residing at Bembridge, in the Isle of Wight, England, have invented Improvements in or Relating to Wind Motors, of which the following is a specification.

The present invention has for its object to provide a wind motor of simple construction which, without, it may be, the aid of wheel gearing, can be used to impart a reciprocating motion to a pump, saw or other device.

To this end it consists broadly in the employment of a vane capable of feathering automatically in opposite directions about an oscillating carrier that is loaded so as normally to tend to occupy a mid position upon an axis that is parallel to the direction of the wind, components of the air current upon the feathered vane causing the carrier to oscillate in opposition to the load, and, by reason of momentum, abnormally to increase the load which ultimately so preponderates as to start the vane in the opposite direction and on that account to reverse the feathering, thereby enabling the vane to swing through the mid portion to another extreme position, whereupon the cycle is repeated.

Such an arrangement, broadly considered, may replace the usual revolving sail arrangement of an ordinary wind-mill, and, unlike the latter, does not necessarily require such a high tower.

More specifically, the motor comprises a long and narrow sail-like member (hereinafter termed a wing) curved in cross section and jointed, as by hinges, at the convex side to a mast arranged at right angles to a horizontal axis, the arrangement being such that the wing, when its concave surface is presented normally to the wind, is bi-laterally symmetrical in relation to the mast and in a condition of unstable equilibrium. When completely displaced in either direction about its hinges however, the surface at the leading edge of the wing is substantially coincident with the direction of the wind and this position is maintained until the end of the swing in that direction is complete. The total oscillation of the wing may conveniently be about 140° and the feathering movement of the wing about the mast may be damped or controlled by any suitable braking means, such as dash pots, to lessen shock.

One constructional arrangement of wind motor embodying the invention, is illustrated, by way of example, in the accompanying drawings whereof Figs. 1 and 2 are elevations at right angles to one another, Fig. 3 being a plan view.

In this example, the mast comprises two members, one, namely $a$, arranged vertically and parallel to the vertical axis of two circular tracks $b$ and $c$, and the other, namely $d$, being inclined to the vertical. The two members $a$ and $d$ are fixed to and extend upwardly from a pair of blocks $e$ having horizontal journals $f$, $f^1$, mounted in bearings $g$ upon a frame $h$, which is rectangular in plan, the upper ends of the mast members $a$ and $d$, being held in contact and tied by guys $i$ to a weight $j$ that normally holds the mast upright. This weight is suspended from the said bearing blocks $e$ and may have a curved peripheral surface concentric with the bearings $g$, so that by means of a gravity catch arrangement or the like, upon the frame, the weight, when the wing oscillation exceeds a given arc, can be held up automatically, as by the catch arrangement engaging the edge $m$ of the weight, thereby rendering the motor self stopping and protecting it from damage during strong winds. The wing proper is indicated at $n$, being of the shape shown, and connected to the member $a$ by hinges $o$. $p$ are movement damping connectors articulated to the wing and member $d$.

One of the journals, namely $f$, is provided at its outer end with a crank $r$, or equivalent device, as for instance, an eccentric, connected to the connecting rod $s$ of a vertically arranged pump $t$ about the axis of which the frame $h$ is mounted to turn.

The frame $h$ may, as in the example shown, be provided with wheels or runners $u$ associated with the smaller, namely $b$, of the two circular tracks $b$ and $c$ the centre of which is coincident with the vertical axis of the pump $t$, but the frame rests directly upon the larger track $c$ except when it requires to be angularly displaced to hold the wing up to the wind, which may be done by any suitable or known means involving the use of a rudder plane or tail. For example, a crank $v$ upon a prolongation of the journal $f^1$ opposite to the journal $f$ that is connected to the pump $t$, may be coupled through a rod $w$ to a lever $x$ forming, with a pair of legs $y$, two toggles, which, when the tail $z$ extends in the direction of the wind, are mutually displaced by a downward extension $z^1$ of the tail $z$, so that neither of the feet 1 thereof encounters the larger track $c$. So soon as a slight angular change of the wind occurs however, the foot of one or other of these toggles is caused to press on the track $c$ and step the apparatus around the axis of the track until the tail $z$ again extends in the direction of the wind.

For instance, if when looking at Fig. 1, it be assumed that the wind will displace the tail vane $z$ to the right, then the downward extension $z^1$ will move to the right and so tilt the left hand leg $y$ that its foot 1 will encounter the track $c$. The lever $x$, as will be apparent, is continuously rocked by the crank $v$ through its rod $w$ and therefore as long as the left hand foot engages the track $c$ each upward pull of the rod $w$ will cause the lever $x$ and the left leg $y$, which constitute one toggle combination, to straighten, with the result that the frame $h$ will be tilted until the weight thereof is borne only by the wheels and toggle when naturally the whole will travel upon the wheels $u$ angularly in the same direction as the vane $z$ was displaced until the frame has been moved into a position at right angles to the vane and both toggle legs are moved clear of the track $c$ whereupon the frame again drops into frictional contact with the track $c$. In the same way downward movements of the rod $w$ will cause the lever $x$ to step the frame round in the opposite direction when the vane $z$ is displaced to the left and brings the right hand leg $y$ and foot 1 into action.

The oscillating motion of the frame could, if desired, by suitable gearing driven from the crank $r$ or equivalent, be used to impart rotary motion to a body to be operated.

What I claim is:—

1. A wind motor comprising a normally vertical mast mounted to oscillate about a horizontal axis, a wing mounted on said mast above its axis of movement and capable of feathering automatically in opposite directions on said mast, under the action of wind thereon, and loading means connected to said mast below its axis of movement and adapted to cause the mast normally to occupy the mid position of its oscillating movement and after being moved to one side of said mid position by the action of wind on said feathering wing, to cause said carrier and feathering vane to swing in the opposite direction.

2. A wind motor, comprising a normally vertical mast mounted to oscillate about a horizontal axis, a feathering wing jointed to said mast above its axis of movement and having a convex surface which, when presented normally to the wind, is bi-laterally symmetrical in relation to the mast and in a condition of unstable equilibrium and a weight suspended from said oscillating mast, below its axis of movement.

3. A wind motor comprising a normally vertical mast mounted to oscillate about a horizontal axis, a wing mounted on said mast above its axis of movement and capable of feathering automatically in opposite directions on said mast, under the action of wind thereon, braking means adapted to damp or control the feathering movements of said wing, and loading means connected to said mast below its axis of movement and adapted to cause the mast normally to occupy the mid position of its oscillating movement and after being moved to one side of said mid position by the action of wind on said feathering wing, to cause said mast and feathering vane to swing in the opposite direction.

4. A wind motor, comprising a normally vertical mast mounted to oscillate about a horizontal axis, a feathering wing jointed to said mast above its axis of movement and having a concave surface which, when presented normally to the wind, is bi-laterally symmetrical in relation to the mast and in a condition of unstable equilibrium a weight suspended from said oscillating mast below its axis of movement and means adapted automatically to hold said weight in position when the mast oscillation exceeds a given arc.

5. A wind motor comprising a normally vertical mast, supporting means therefor arranged to be oscillated by said mast about a horizontal axis, bearings for said supporting means, an upwardly extending feathering wing jointed to said mast above the axis of movement thereof and having a concave front surface, a weight suspended from said mast supporting means, a movable frame for carrying said bearings and means connected to said mast supporting means for transmitting motion from said mast to the body to be operated.

6. A wind motor comprising a normally vertical mast, supporting means therefor arranged to be oscillated by said mast about a horizontal axis, bearings for said supporting means, an upwardly extending feathering wing jointed to said mast above the axis of movement thereof and having a concave front surface, means for damping the feathering motion of said wing, a weight suspended from said mast supporting means, a movable frame for carrying said bearings and means connected to said supporting means for transmitting motion from said mast to the body to be operated.

7. A wind motor comprising a normally vertical mast, supporting means therefor arranged to be oscillated by said mast about a horizontal axis, bearings for said supporting means, an upwardly extending feathering wing jointed to said mast above the axis of movement thereof and having a concave front surface, a weight suspended from said mast supporting means, a supporting frame for said bearings arranged to turn about a vertical axis and a reciprocating pump arranged to be driven from said mast supporting means and having the vertical axis of its cylinder at the centre of movement of said frame.

8. A wind motor comprising a normally vertical mast, supporting means therefor arranged to be oscillated by said mast about a horizontal axis, bearings for said supporting means, an upwardly extending feathering wing jointed to said mast above the axis of movement thereof and having a concave front surface, a weight suspended from said mast supporting means, a frame carrying said mast supporting means and movable about a vertical centre, a track for said frame, means connected to said mast supporting means for transmitting motion therefrom to means to be operated, a rudder plane or tail connected to said mast supporting means, and means carried by said frame and adapted to be operated by said rudder plane or tail for stepping said frame and parts supported thereby around its centre of motion when the rudder plane or tail does not extend in the direction of the wind acting on said wing.

9. A wind motor comprising a normally vertical mast, supporting means therefor arranged to be oscillated by said mast about a horizontal axis, bearings for said supporting means, an upwardly extending feathering wing jointed to said mast above its horizontal axis of movement and having a concave front surface, a weight suspended from said mast supporting means, a movable frame for carrying said bearings, means connected to said supporting means for transmitting motion from said mast to the body to be operated, and a catch arrangement adapted to engage said weight and hold it in a raised position when the oscillation of the wing and mast exceeds a given arc.

10. A wind motor comprising a supporting frame, means whereby the frame can be rotated about a vertical axis, a normally vertical mast, means carried by said frame, and arranged to support said mast so that it can oscillate about a horizontal axis, a load connected to and tending to right the mast and maintain it in a vertical position, a wing, hinges upon the mast arranged with their axes parallel thereto and about which the wing is movable and means whereby the frame is adjusted to maintain the mast in a position with the wing facing the wind, with the mast behind the wing and with the hinges between the wing and mast, the said wing being free to feather so that components of the air current upon it will cause the mast to oscillate in opposition to the load and the disposition of the mass of the wing in relation to the hinges and mast ensuring the wing feathering again automatically when, by reason of momentum, the load is so abnormally increased as ultimately to preponderate and start the wing moving in the opposite direction.

11. In a wind motor, a normally vertical mast adapted to oscillate about a horizontal axis, a wing having a concave front surface for presentation to the wind and hinges between the rear of the wing and the mast with their axes parallel to the latter and arranged so that the wing is bi-laterally symmetrical in relation thereto.

12. In a wind motor, a normally vertical mast adapted to oscillate about a horizontal axis, a self feathering wing having a concave front surface for presentation to the wind, hinges between the rear of the wing and the mast with their axes parallel to the latter and arranged so that the wing is bi-laterally symmetrical in relation thereto, and means for damping the feathering movements of said wing.

13. In a wind motor, a normally vertical mast, a carrier therefor adapted to oscillate about a horizontal axis, a weight loading said carrier and tending to maintain said mast in a vertical position and means adapted automatically to arrest the weight when the mast with wing carrier and weight oscillation exceeds a given arc.

14. A wind motor comprising a frame mounted to turn about a vertical axis, horizontal bearings carried by said frame, a normally vertical mast comprising vertical and inclined members united at their upper ends, blocks connected to the lower ends of said members and provided with journals mounted in said bearings, a weight suspended from said blocks, guys connecting the upper ends of the mast to said weight and mechanisms connected to one of said journals and adapted to be driven therefrom.

Signed at Bembridge in the Isle of Wight England this twenty-seventh day of February, 1922.

JOHN ISAAC THORNYCROFT.